(12) United States Patent
Moon et al.

(10) Patent No.: US 8,147,661 B2
(45) Date of Patent: Apr. 3, 2012

(54) UNIT FOR THE ELECTROLYSIS OF WATER

(75) Inventors: Joseph Michael Moon, Virginia Beach, VA (US); Joseph E. Leiato, Grafenwoehr (DE); Timothy Iinug Mark Yataman Leiato, Grafenwoehr (DE)

(73) Assignee: Green on Demand GmbH, Grafenwoehr (DE)

( * ) Notice: Subject to any disclaimer, the term of this patent is extended or adjusted under 35 U.S.C. 154(b) by 284 days.

(21) Appl. No.: 12/584,088

(22) Filed: Aug. 31, 2009

(65) Prior Publication Data

US 2011/0048932 A1    Mar. 3, 2011

(51) Int. Cl.
    *C25B 9/06*     (2006.01)
    *C25B 9/18*     (2006.01)
    *C25C 7/02*     (2006.01)

(52) U.S. Cl. ............... 204/278.5; 204/275.1; 204/278; 204/267; 204/268; 204/269; 204/270

(58) Field of Classification Search ............ 204/267, 204/268, 269, 270, 275.1, 278, 278.5
See application file for complete search history.

(56) References Cited

U.S. PATENT DOCUMENTS

| | | | | |
|---|---|---|---|---|
| 4,124,480 | A * | 11/1978 | Stevenson | 204/268 |
| 4,206,029 | A | 6/1980 | Spirig | 204/228 |
| 6,533,919 | B1 | 3/2003 | Narayanan et al. | 205/637 |
| RE38,066 | E | 4/2003 | Puthawala | 204/230.5 |
| 6,663,783 | B2 * | 12/2003 | Stephenson et al. | 204/242 |
| 7,393,440 | B2 | 7/2008 | Ghosh et al. | 204/275.1 |
| 7,510,633 | B2 | 3/2009 | Shimko et al. | 206/628 |
| 2003/0180584 | A1 * | 9/2003 | Suzuki et al. | 429/9 |
| 2006/0204815 | A1 | 9/2006 | Lam | 429/34 |
| 2007/0272548 | A1 | 11/2007 | Sutherland et al. | 204/242 |
| 2009/0078568 | A1 | 3/2009 | Ramaswami et al. | 204/266 |
| 2009/0139856 | A1 | 6/2009 | Chiarini, Jr. | 204/272 |

FOREIGN PATENT DOCUMENTS

| | | |
|---|---|---|
| CN | 101 289 747 A | 10/2008 |
| CN | 101 445 940 A | 6/2009 |
| DE | 44 43 476 A1 | 6/1996 |
| FR | 2 634 226 A1 | 1/1990 |
| JP | 2008208722 | 9/2008 |
| WO | WO 93/25730 | 12/1993 |
| WO | WO 2008/154721 | 12/2008 |
| WO | WO 2010/080018 A1 | 7/2010 |

OTHER PUBLICATIONS

"Fuel From Water"; 12$^{th}$ edition, Copyright © 2008 by Merit Products Inc. Box 6868, Louisville, KY 40206; ISBN 978-0-945516-04-0.

Abstract of Chinese Publication CN 101289747 of Oct. 22, 2008, see specification of further description.

* cited by examiner

*Primary Examiner* — Bruce Bell
(74) *Attorney, Agent, or Firm* — Davidson, Davidson & Kappel, LLC

(57) ABSTRACT

The invention discloses a unit for the electrolysis of water. The unit includes a plurality of stacked conductive plates which are separated from each other by a non conductive sealing ring. At least one of the stacked conductive plates functions as an anode. A plurality of the conductive plates functions as a cathode, wherein the number of cathodes is double the number of anodes.

15 Claims, 6 Drawing Sheets

UNIT FOR THE ELECTROLYSIS OF WATER

FIELD OF THE INVENTION

The present invention relates to a cell for water electrolysis.

BACKGROUND OF THE INVENTION

The environmental effects of pollution and global warming require an energy source which is easy available and lowers the pollution. There is an ongoing search for another viable, safe and economical source of alternative fuel compared to fossil fuel. Hydrogen is the most abundant element in the universe. On earth, 90% of the hydrogen atoms are found in water and consequently water has been vied as the favorite choice for an endlessly and renewable fuel propulsion source.

Electrolysis is the main procedure that is being used to produce hydrogen from water. Each water molecule has two hydrogen atoms and one oxygen atom. Passing an electric current through water causes the two gases to separate. The oxygen migrates to the positive electrode, the anode and the negative electrode, the cathode, attracts the hydrogen. The resulting process yields twice as much hydrogen as oxygen.

The text book "Fuel From Water"; $12^{th}$ edition, Copyright© 2008 by Merit Products Inc. Box 6868, Louisville, Ky. 40206; ISBN 978-0-945516-04-0, discloses various concepts to obtain hydrogen from water and the hydrogen is used for example as an energy source for providing power for an internal combustion engine.

U.S. Pat. No. 6,533,919 discloses a method for electrolysis of an aqueous solution of an organic fuel. The electrolyte is a solid-state polymer membrane with anode and cathode catalysts on both surfaces for electro-oxidation and electro-reduction.

In German Patent Application DE 44 43 476 A1, a method is described which provides an internal combustion engine of a vehicle with hydrogen. The vehicle has an electrolysis device for the production of hydrogen and several storage tanks for hydrogen.

U.S. Pat. No. RE 38,066 discloses an electrolysis apparatus which has a number of membrane electrolysis cells. Each of the cells has a membrane formed on both sides with a contact layer. The apparatus, while it is compact in its design, is also suitable for comparatively high hydrogen production rates and can consequently be used particularly flexibly. A contact plate is respectively arranged on each contact layer. Each of the contact plates is formed, on its surface facing the contact layer assigned to it, with a system of ducts for the transport of water and/or gas.

U.S. Pat. No. 7,393,440 provides a system for generating hydrogen gas in an aqueous solution based electrolytic or galvanic cell, wherein the cathode is made from aluminum or an aluminum alloy. In a preferred arrangement the cell is a galvanic cell and cathode is made from aluminum or aluminum alloy and the anode is made from magnesium or magnesium alloy U.S. Pat. No. 7,510,633 discloses an electrolyzer cell for the electrolysis of water and includes a cathode of generally tubular configuration within which is disposed an anode separated from the cathode by a separation membrane of generally tubular configuration which divides the electrolyte chamber into an anode sub-chamber and a cathode sub-chamber. An electrolyzer apparatus includes an array of individual cells across each of which an electric potential is imposed by a DC generator via electrical leads. Hydrogen gas generated within cells from electrolyte is removed via hydrogen gas take-off lines and hydrogen manifold line. By-product oxygen is removed from cells by oxygen gas take-off lines and oxygen manifold line. The electrolyzer apparatus may be configured to operate either batchwise or in a continuous electrolyte recycle operation to produce high purity hydrogen at high pressure, e.g., up to about (10,000) psig, without need for gas compressors to compress product hydrogen.

US-Patent Application 2009/078568 relates to an on-demand hydrogen gas generation device, suitable for use in a fuel cell, which utilizes water electrolysis, and more particularly galvanic cell corrosion, and/or a chemical hydride reaction, to produce hydrogen gas. The present disclosure additionally relates to such a device that includes a switching mechanism that has an electrical current passing therethrough and that repeatedly and reversibly moves between a first position and a second position when exposed to pressure differential resulting from hydrogen gas generation, in order to alter the rate, at which hydrogen gas is generated, such that hydrogen gas is generated on an as-needed basis for a fuel cell connected thereto, and/or ensure a substantially constant flow of hydrogen gas is released therefrom. The present disclosure additionally or alternatively relates to such an on-demand hydrogen gas generation device that includes a gas management system designed to maximize the release or evolution of hydrogen gas, and in particular dry hydrogen gas, therefrom once it has been formed, thus maximizing hydrogen gas output. The present disclosure is still further directed to a fuel cell including such an on-demand hydrogen gas generation device, and in particular to a fuel cell designed for small-scale applications.

International Patent Application WO 2008/154721 discloses a process encompassing hydrogen and oxygen gases as a partial fuel source when utilized together with a fossil-based fuel to power conventional internal combustion engines. Hydrogen and oxygen gases are produced by electrolysis in an electrolyzer unit(s), on-demand and on-board a vehicle, or in stationary applications, eliminating the need of highly-pressurized hydrogen storage tanks. When said gases are introduced into the combustion chamber of the engine, via the air intake assembly, they increase the efficiency of the combustion burn by enriching the air to fuel ratio, resulting in a reduction of the fossil-based fuels required for optimum engine performance, said gases effectively becoming a partial hybrid fuel source. The process includes scalability for all size and types of installations, cold-weather applications and longer operating capabilities. As an additional benefit, in direct correlation, this process reduces carbon dioxide emissions, and, in varying quantities, other greenhouse gas emissions.

Chinese Patent Application CN 101289747 relates to a hydrogen generating device, in particular to a generating device for automobile hydrogen fuel energy. The device includes a storage battery cell and a hydrogen-oxygen generator, wherein a hydrogen outlet and an oxygen outlet are respectively communicated with a combustion cylinder; the hydrogen-oxygen generator is an SPE technology hydrogen-oxygen generator for water electrolysis and purification. By providing an automobile engine with hydrogen and oxygen generated in water electrolysis and purification as automobile auxiliary energy, the device can save 20 percent of fuel and reduce the emission of harmful gas, which is beneficial to environment protection. The application of the device does not need to change any main structure of an automobile and can be carried out directly on line. The device has the advantages of no pollution, high efficiency, good safety performance and convenient operation, which can be used in all weather conditions Japanese Patent Application JP 2008208722 discloses a water electrolysis cell including a pair of separators, a solid polymer electrolytic membrane provided between a pair of the separators and having an anode side electrode and a cathode side electrode formed on both surfaces. The feed conductor is interposed between the solid high polymer membrane and the separator. The electrode forming surface is formed except a site where the gas pool of the gas (gaseous hydrogen or gaseous oxygen) produced by the water electrolysis.

US Patent Application US 2007/272,548 A1 discloses an electrode assembly for use in an electrochemical cell, said electrode being in the proportions of a pyramid with the proportions of the pyramidal shape being determined by a specific formula where the height is multiplied by a figure between 1 and 2 to determine the four side lengths and the height is multiplied by a figure between 1.20 and 2.22 to determine the four base lengths.

US Patent Application US 2009/139,856 A1 discloses a cell assembly and a vertically disposed electrode stack within the cell chamber for the electrolysis of water to produce hydrogen and oxygen upon the application of electric current to the electrodes. The cell assembly is arranged to contain an electrode stack immersed in water, the stack consisting of at least two electrodes in the form of or having the shape of quadric surfaces such as cones or cylinders. The electrodes are mounted in close concentric proximity to one another and are positioned by support posts which may also serve as electrical connections and are mounted at the base of the cell chamber and extend upwardly through the base of each electrode. A lip structure to assist in gas dispersement disposed about the upper edge of the upper electrode is also disclosed.

SUMMARY OF THE INVENTION

It is an object of the present invention to provide an unit for the electrolysis of water which is simple in construction and provides electrolysis products on demand from water at rate to power of an internal combustion engine at least partially without the need to store the electrolysis products.

The present invention provides a unit for the electrolysis of water including:
  a first lateral housing wall;
  a second lateral housing wall;
  a plurality of stacked conductive plates, which are separated from each other by a non conductive sealing ring and wherein the first lateral housing wall and the second lateral housing wall are separated from the following conductive plate by a non conductive sealing ring as well:
  at least one of the stacked conductive plates functions as an anode; and a plurality of the conductive plates functions as a cathode, wherein the number of cathodes are double the number of anodes;
  the conductive plates not functioning as anode or cathode are arranged such that between the at least one anode and each of the cathodes at least one additional conductive plate is positioned; and
  between each outermost cathode and the first lateral housing wall and the second lateral housing wall at least one additional conductive plate is positioned.

Each plate of the plurality of stacked plates has a rectangular shape. The non conductive sealing ring is as well of rectangular shape so that it matches the rectangular shape of the plates. The sealing ring is preferably made of EPDM rubber (ethylene propylene diene Monomer (M-class) rubber), a type of synthetic rubber, is an elastomer which is characterized by wide range of applications. The E refers to Ethylene, P to Propylene, D to diene and M refers to its classification in ASTM standard D-1418. The "M" class includes rubbers having a saturated chain of the polymethylene type. The diene(s) currently used in the manufacture of EPDM rubbers are DCPD (dicyclopentadiene), ENB (ethylidene norbornene) and VNB (vinyl norbornene).

The ethylene content is around 45% to 75%. The higher the ethylene content the higher the loading possibilities of the polymer, better mixing and extrusion. During peroxide curing these polymers give a higher crosslink density compared with their amorphous counterpart. The amorphous polymers are also excellent in processing. This is very much influenced by their molecular structure. The dienes, typically including between 2.5 wt % up to 12 wt % of the composition serve as crosslinks, which provide resistance to unwanted tackiness, creep or flow during end use.

The plurality of stacked conductive plates is arranged between the first lateral housing wall and the second lateral housing wall. A plurality of bolts is arranged equally outside the stacked conductive plates and firmly holds the stacked conductive plates in place between the first lateral housing wall and the second lateral housing wall. These conductive plates, which function as the anode and as the cathode, have an ear with a through hole. Each of the through holes routes a respective bolt and the bolts provide the power supply for the anodes and the cathodes respectively.

Each plate of the stack of conductive plates has a plurality of through holes formed within its rectangular shape. The through holes allow fluid and gas communication between each compartment formed by two conductive plates and the non conductive sealing ring arranged there between.

According to another embodiment of the invention, the at least one anode and the plurality of cathodes have a rectangular central cut out within their rectangular shape.

The first lateral housing wall has an inlet for water from a reservoir. The second lateral housing wall has an outlet for electrolysis products. According to one embodiment of the invention the stack of conductive plates includes essentially one anode, two cathodes and eight conductive plates, to which no voltage is applied. It is evident for a person skilled in the art that the above mentioned embodiment is not limiting the scope of the invention.

The stack of conductive plates is arranged such that following the first lateral housing wall a conductive plate is provided, followed by the first cathode, followed by the three conductive plates, followed by the anode, followed by the three conductive plates, followed by the second cathode, followed by one conductive plate and followed by the second lateral housing. The conductive plates are separated by 3 mm to 6 mm.

The plates are of electrically conductive material. Preferably, the material is steel, stainless steel, aluminum, palladium or titanium. The surface of the plates is treated in such a way that the adhesion of the gas bubbles to the plates, produced during the electrolysis process, is reduced. The surface finishing step cleans the surface of the plates and provides a smooth and regular finish to the plates. The surface treatment causes a faster release of the products generated by the electrolysis process. The conductive plates are surface treated in order to provide a smooth a clean surface for the plates. The plates are sanded on both sides and surface cleaned in a base for several hours. The surface cleaning process of the plates is done chemically and comparable to an etching process.

The first lateral housing wall and the second lateral housing wall are made of non conductive material.

At temperatures below freezing an anti freeze agent can be added to the water reservoir/and or the electrolysis device.

BRIEF DESCRIPTION OF THE DRAWINGS

Exemplary embodiments will describe the apparatus for economically forming packing unit layers according to the present invention in more detail and its advantages with reference to the accompanying drawings, in which.

DETAILED DESCRIPTION OF THE INVENTION

Figure 1:
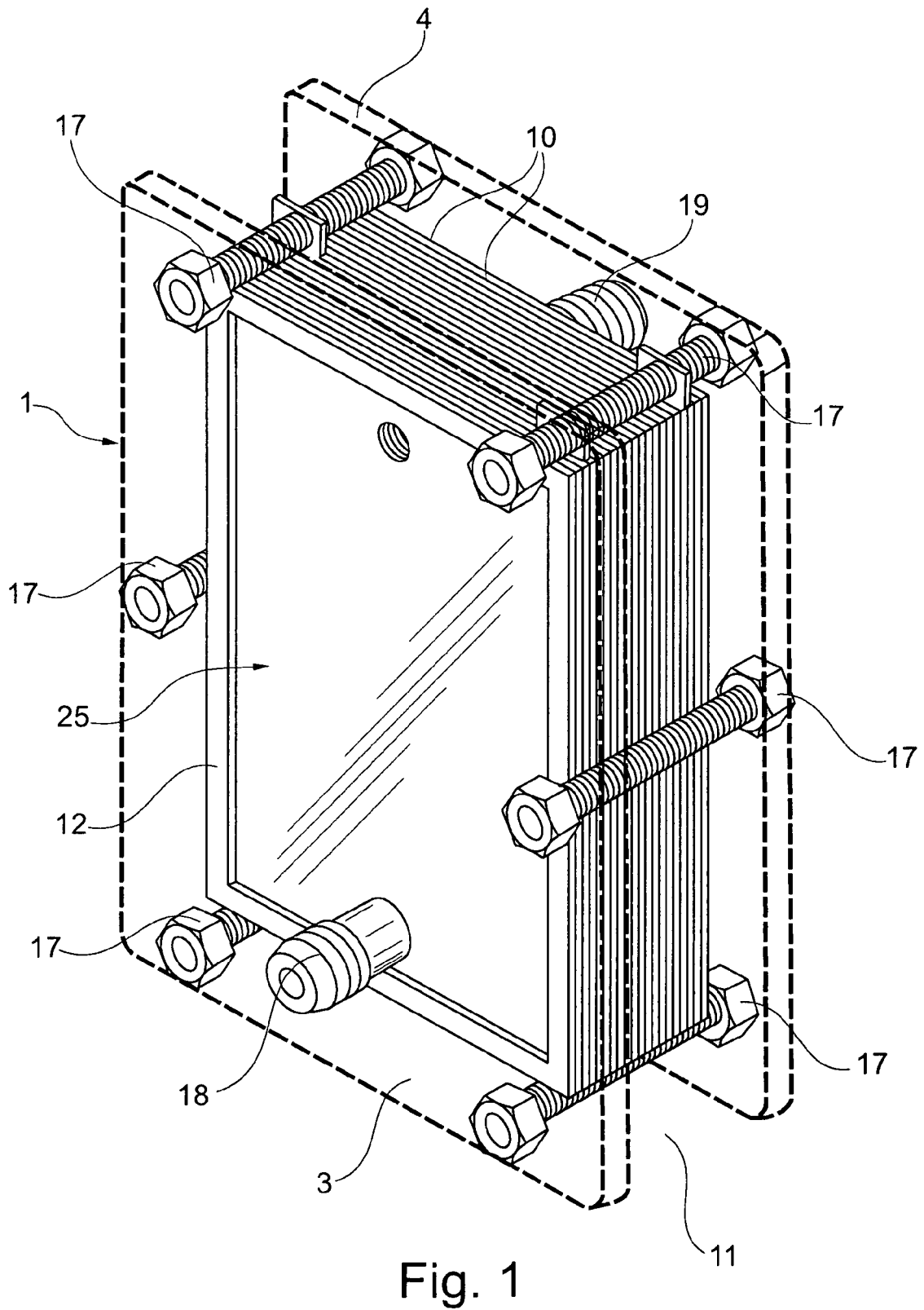
FIG. 1 is a perspective view of a preferred embodiment of the unit for electrolysis of water and the production of electrolysis products for an internal combustion engine.

Identical reference numerals are used for the same or equivalent elements of the invention. Furthermore, only reference numerals are shown in the drawings which are necessary for the description of each figure for clarity.

FIG. 1 schematically shows a perspective view of the unit 1 for the electrolysis of water. The unit includes a plurality of conductive plates 10 which are arranged in a stack 11. The stack 11 of conductive plates 10 is arranged between a first lateral housing wall 3 and a second lateral housing wall 4. All of two consecutive plates of the stacked conductive plates 10 are separated from each other by a non conductive sealing ring 12. Additionally, the first lateral housing wall 3 and the second lateral housing wall 4 are separated from the following conductive plate $10_3$ or $10_4$ by a non conductive sealing ring 12 as well (see FIG. 2). The stacked plates 10 have a rectangular shape and the non conductive sealing ring 12 is of the rectangular shape and matches the rectangular shape of the conductive plates 10. Within the stack 11 of conductive plates 10 at least one of the stacked conductive plates 10 functions as an anode 15. A plurality of the conductive plates 10 functions as a cathode 16, wherein the number of cathodes 16 is double the number of anodes 15. The conductive plates 10 are arranged such that between the at least one anode 15 each of the cathodes 16 at least one conductive plate 10, not functioning as an anode 15 or cathode 16, is provided. One additional conductive plate 10 is positioned between each outermost cathode 16 and the first lateral housing wall 3 and the second lateral housing wall 4.

The plurality of stacked conductive plates 10 is arranged between the first lateral housing wall 3 and the second lateral housing wall 4, wherein a plurality of bolts 17 is arranged equally around the circumference of the stacked conductive plates 10. The bolts 17 together with the first lateral housing wall 3 and the second lateral housing wall 4 firmly hold the stack 11 of conductive plates 10 and the intermediary sealing ring 12 in place. The intermediate sealing ring 12 provides with two conductive plates 10 a compartment 25, which is filled with water. The sealing ring 12 ensures that no water leeks to the environment around the inventive unit 1. The first lateral housing wall 3 of the inventive unit 1 is provided with an inlet 18 for water from a reservoir (see FIG. 8). The second lateral housing wall 4 of the inventive unit 1 provides an outlet 19 for electrolysis products.

Figure 2:
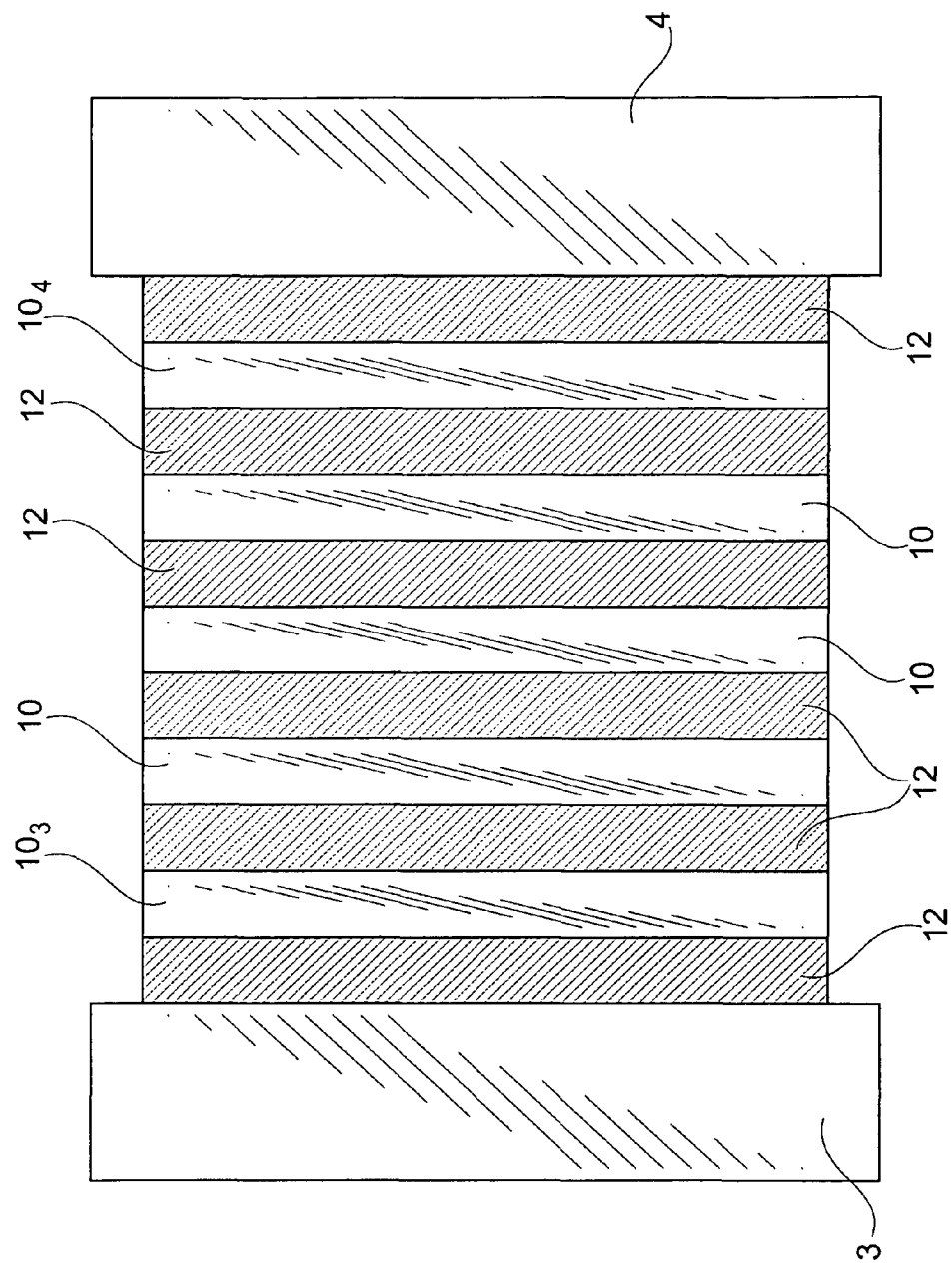
FIG. 2 is a schematic view of the arrangement of the conductive plates and the sealing rings.

FIG. 2 shows a schematic view of the arrangement of a plurality of conductive plates 10 between the first lateral housing wall 3 and a second lateral housing wall 4. The first lateral housing wall 3 is separated by the non conductive sealing ring 12 from the first following conductive plate $10_3$. Additionally, the second lateral housing wall 4 is separated by a non conductive sealing ring 12 from the last conductive plate $10_4$ of the stack of conductive plates 10. Within the stack of conductive plates 10, the conductive plates 10 are separated from each other by the sealing ring 12. The number of conductive plates 10, the number of anodes 15 and cathodes 16 within the stack depends on the amount of electrolysis products to be generated by the unit in order to power an internal combustion engine.

Figure 3:
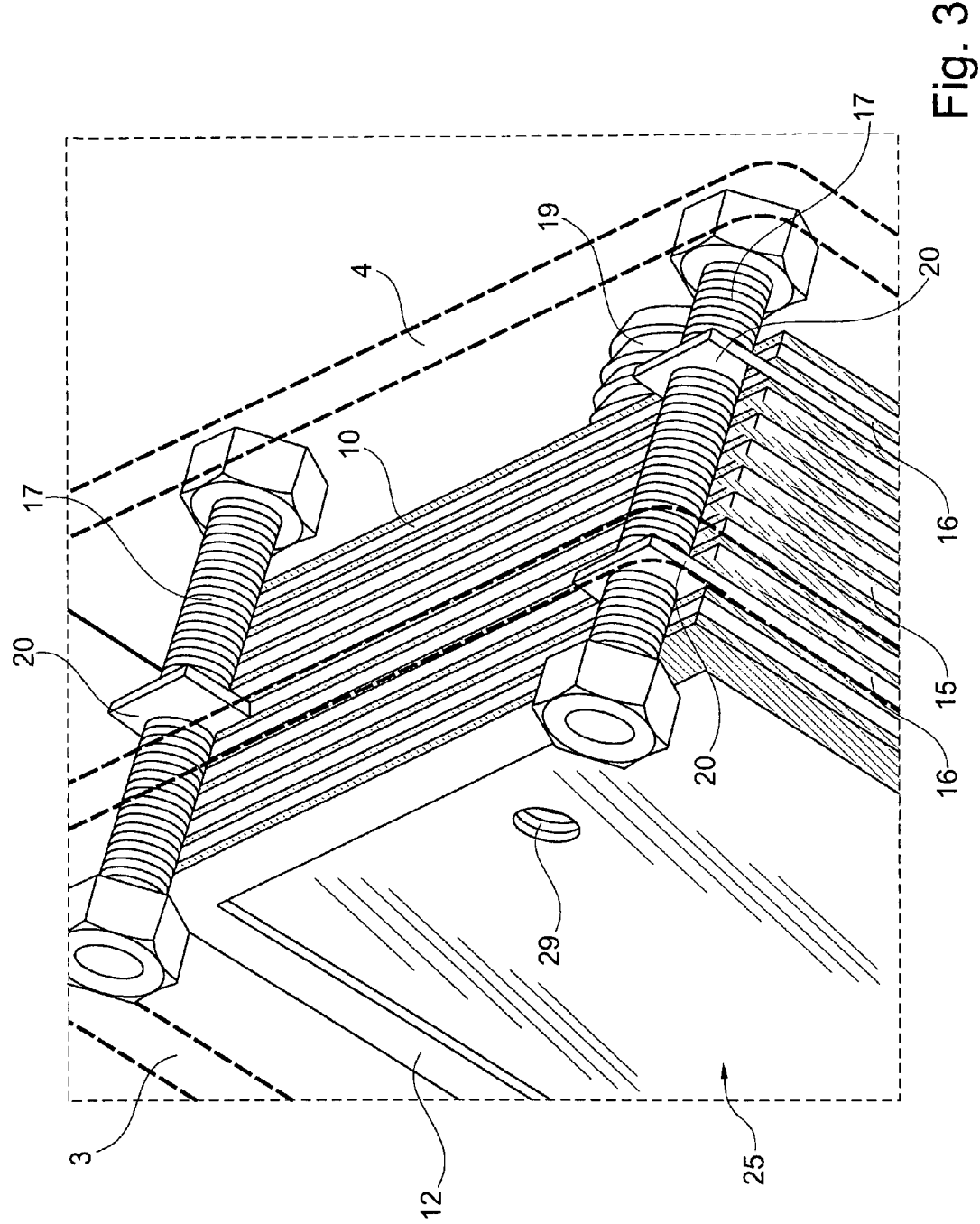
FIG. 3 is an enlarged perspective view of the embodiment shown in FIG. 1.

FIG. 3 shows an enlarged perspective view of the unit 1 displaying the portion of the unit 1 with the electrical connections to the anodes 15 and the cathodes 16. FIG. 1 and FIG. 3 show the preferred embodiment with one anode 15 and two cathodes 16. As mentioned before, the anodes 15 and the cathodes 16 are conductive plates 10 as well, which all together form the stack 11 of conductive plates 10. The anodes 15 and the cathodes 16 differ from the conductive plates in that each anode 15 and cathode 16 has an ear 20 formed. Via the ear 20, the electrical connection to the anode 15 and the cathode 16 is provided respectively. The stack 11 of conductive plates 10 is arranged such that following the first lateral housing wall 3 a conductive plate 10 is provided which is not connected to an electrical power supply. This conductive plate 10 is followed by the first cathode $16_1$. The first cathode $16_1$ is followed by the three conductive plates 10, which are not connected to an electrical power supply. The stack 11 of this three conductive plates 10 followed by the anode 15. The anode 15 is followed by an additional stack 11 of three conductive plates 10, which are not connected to an electrical power supply. The stack 11 of those three conductive plates 10 is followed by the second cathode $16_2$. The second cathode $16_2$ is followed by a single conductive plate 10 which is not connected to an electrical power supply.

Figure 4:
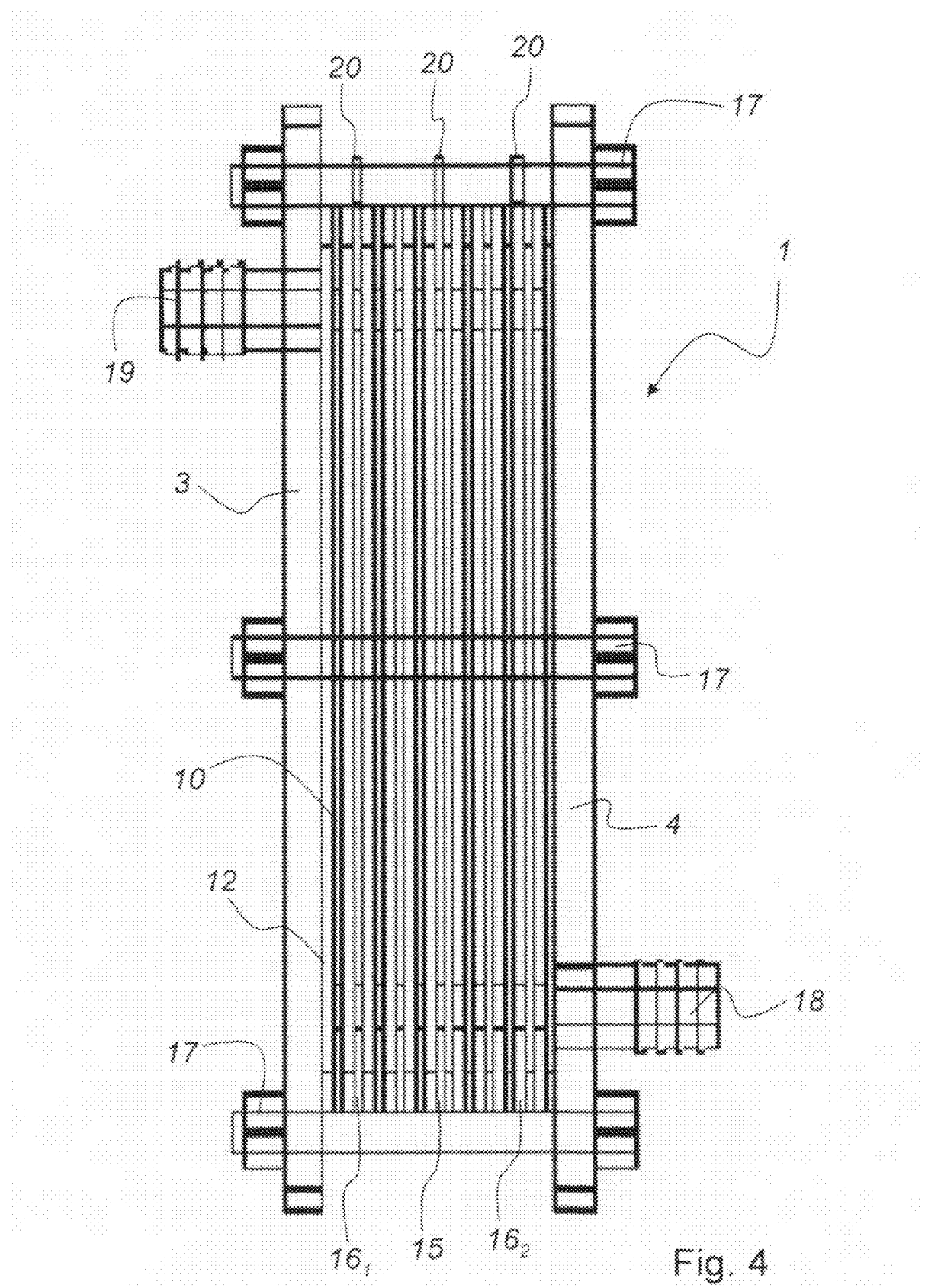
FIG. 4 is a side view of the preferred embodiment as shown in FIG. 1.

FIG. 4 shows a side view of the preferred embodiment of the inventive unit 1. The number of conductive plates 10 within the stack is the same as in the embodiment described in FIG. 3. The ears 20 of the anode 15, the first cathode $16_1$ and the second cathode $16_2$ are connected to the respective bolt 17 in order to provide power to the anode 15, the first cathode $16_1$ and the second cathode $16_2$. The first lateral housing wall 3 carries an inlet 18 for water. The second lateral housing wall 4 carries an outlet 19 for the products of the electrolysis process. As mentioned above, the unit 1 includes several compartments 25, which are formed by the one sealing ring 12 arranged between two conductive plates 10 or arranged between the first lateral housing wall 3 or the second lateral housing wall 4 and the following conductive plate 10. The bolts 17 press the first lateral housing wall 3 or the second lateral housing wall 4 together, so that the stack of conducting plates 10 is hold firmly in place. In addition the pressing force applied by the bolts 17 ensures that the formed compartments 25 are water tight and no water leaks out.

Figure 5:
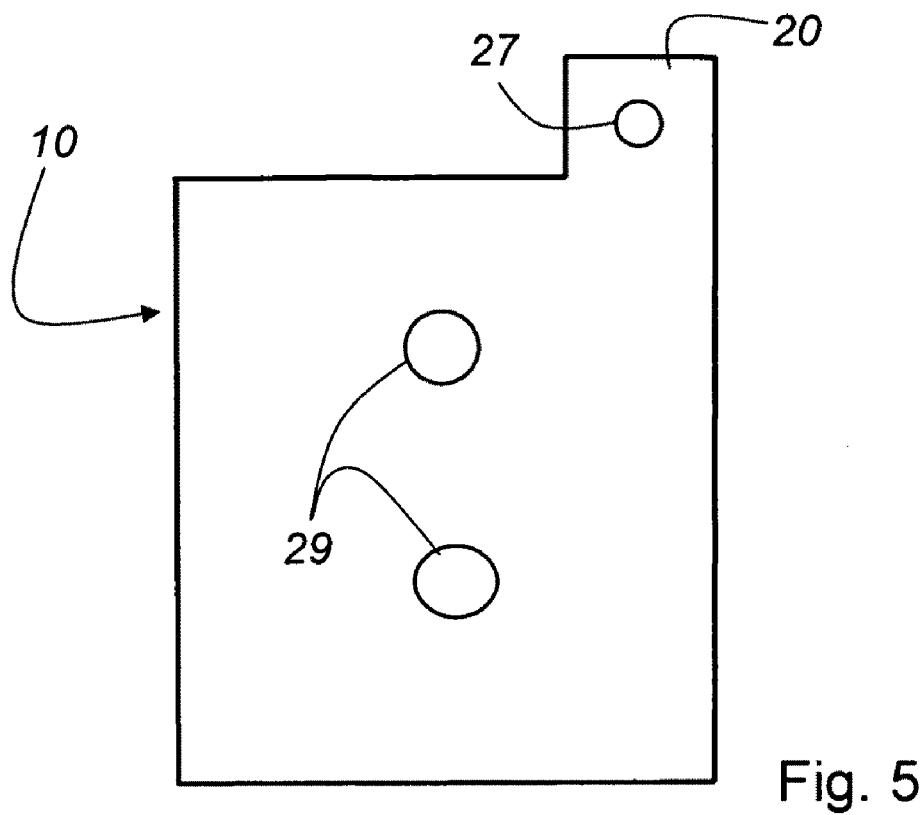
FIG. 5 is one embodiment of the shape of the conductive plates.
Figure 6:
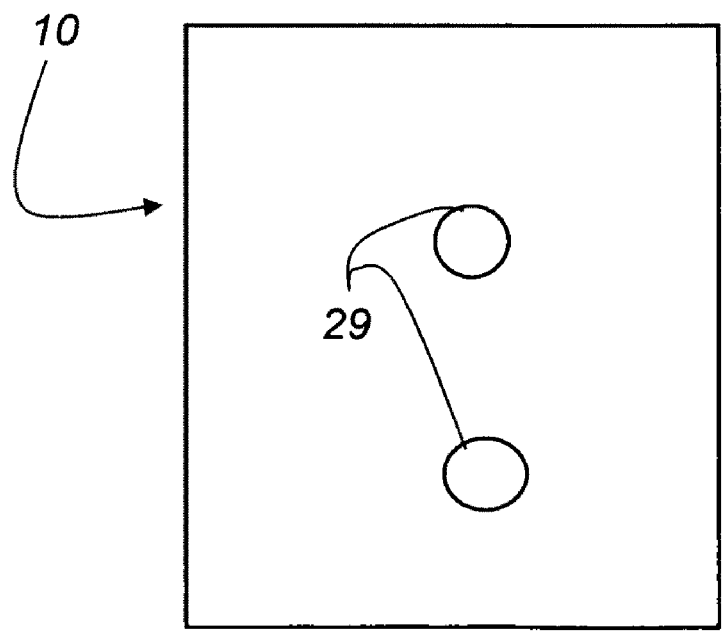
FIG. 6 is one embodiment of the shape of the conductive plates used as anode and cathode.

FIG. 5 shows a one embodiment of a conductive plate 10 which functions as an anode 15 or a cathode 16. Each conductive plate 10 which functions as an anode 15 or a cathode 16 has one ear 20 which is used for the power supply to the unit 1. The ear 20 has one opening 27 through which the respective bolts 17 for power supply are guided. In order to allow fluid communication and communication of the product of the electrolysis process between the compartments 25 of the stack 11, each conductive plate 10 has additional openings 29 formed in the rectangular section of the conductive plates 10 (see FIGS. 5 and 6).

Figure 7:
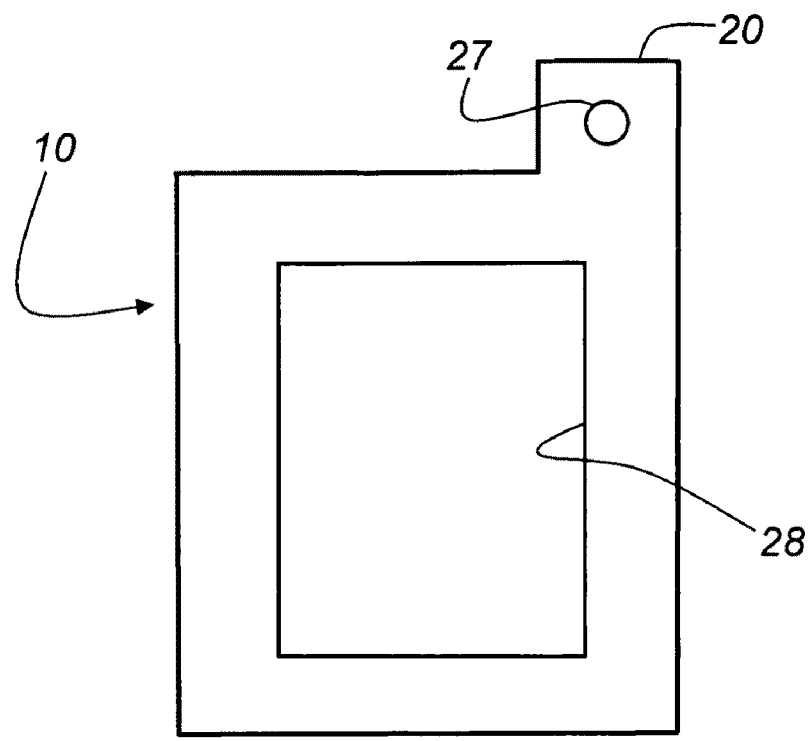
FIG. 7 is a further embodiment of the shape of the conductive plates used as anode and cathode.

FIG. 7 shows an alternative design of a conductive plate 10 which functions as an anode 15. The rectangular section of the conductive plate 10 has a rectangular opening 28.

Figure 8:
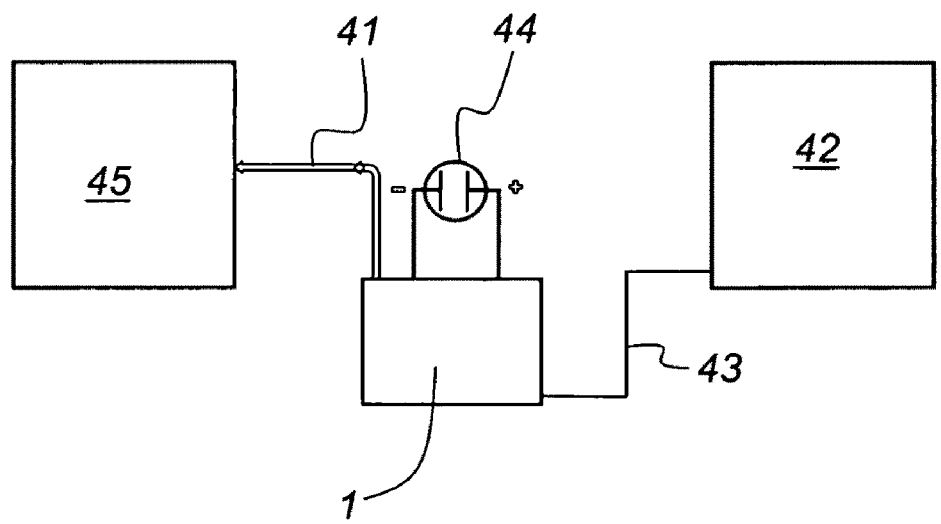
FIG. 8 is a schematic view of the unit in combination with an internal combustion engine.

FIG. 8 is a schematic arrangement of the inventive unit 1 in combination with an internal combustion engine 45. The unit is provided with refill water via a duct 43 from a reservoir 42. The duct 43 to the unit 1 is mounted to the inlet 18 of the first lateral housing wall 3. A special voltage and a special current are applied by the power supply 44 to the unit 1 via the bolts 17, which are connected with the anodes 15 and the cathodes respectively in order to produce hydrogen and oxygen from water. A duct 41 is mounted by the outlet 19 of the second lateral housing wall 4. The duct 41 transports the products of the electrolysis process to the internal combustion engine 45.

The invention has been described with reference to a preferred embodiment. It goes without saying for a person skilled in the art that changes and modifications can be made without leaving the scope of protection of the appended claims.

What is claimed is:

1. A unit for the electrolysis of water comprising:
a first lateral housing wall provided with an inlet for water from a reservoir;
a second lateral housing wall provided with an outlet for a product of the electrolysis;
a plurality of stacked conductive plates separated from each other by a non conductive sealing ring and wherein the first lateral housing wall and the second lateral housing wall are separated from the following conductive plate by a further non conductive sealing ring as well:
at least one of the stacked conductive plates functioning as an anode; and a plurality of other conductive plates functioning as a cathode, wherein the number of cathodes double the number of anodes;
further conductive plates of the plurality of stacked conductive plates, not functioning as anode or cathode, being arranged such that between the at least one anode and each of the cathodes at least one further conductive plate of the further conductive plates is positioned; and
between each outermost cathode and the first lateral housing wall and the second lateral housing wall at least one additional conductive plate is positioned.

2. The unit as recited in claim 1 wherein the plurality of stacked plates has a rectangular shape and the non conductive sealing ring is of the rectangular shape and matches the rectangular shape of the plates.

3. The unit as recited in claim 1 wherein the plurality of stacked conductive plates is arranged between the first lateral housing wall and the second lateral housing wall and a plurality of bolts is arranged equally outside the stacked conductive plates and firmly hold the stacked conductive plates in place between the first lateral housing wall and the second lateral housing wall.

4. The unit as recited in claim 3 wherein the conductive plates, which function as the anode, and the conductive plates, which function as the cathode, have an ear with a through hole through which respective bolts are routed and the bolts provide the power supply for the anodes and the cathodes respectively.

5. The unit as recited in claim 1 wherein each plate of the stack of conductive plates has a plurality of through holes formed within its rectangular shape to allow fluid and gas communication between each compartment formed by two conductive plates and the non conductive sealing ring arranged there between.

6. The unit as recited in claim 5 wherein the at least one anode and the plurality of cathodes have a rectangular central cut out.

7. The unit as recited in claim 1 wherein the stack of conductive plates comprises essentially one anode, two cathodes and eight conductive plates, to which no voltage is applied.

8. The unit as recited in claim 7 wherein the stack of conductive plates is arranged such that following the first lateral housing wall a conductive plate is provided, followed by the first cathode, followed by the three conductive plates, followed by the anode, followed by the three conductive plates, followed by the second cathode, followed by one conductive plate and followed by the second lateral housing.

9. The unit as recited in claim 1 wherein the conductive plates are separated by 3 mm to 6 mm.

10. The unit as recited in claim 1 wherein the conductive plates are made from steel, stainless steel, aluminum, palladium or titanium.

11. The unit as recited in claim 1 wherein conductive plates are surface treated in order to provide a smooth and clean surface for the plates.

12. The unit as recited in claim 1 wherein the first lateral housing wall and the second lateral housing wall are made of non conductive material.

13. A combination comprising:
the electrolysis unit as recited in claim 1;
a water reservoir supplying water to the inlet of the first lateral housing wall; and
an internal combustion engine receiving electrolysis products from the outlet of the second lateral housing wall.

14. A combination comprising:
the electrolysis unit as recited in claim 1; and
a power supply including a positive terminal connected to the anode and negative terminal connected to the cathode.

15. The combination recited in claim 14 further comprising:
a water reservoir supplying water to the inlet of the first lateral housing wall; and
an internal combustion engine receiving electrolysis products from the outlet of the second lateral housing wall.

* * * * *